(12) United States Patent
Geier et al.

(10) Patent No.: US 7,025,644 B2
(45) Date of Patent: Apr. 11, 2006

(54) HIGH-PERFORMANCE RIVERBOARD SYSTEM

(75) Inventors: Robert Geier, Boise, ID (US); Kevin Veon, Boise, ID (US)

(73) Assignee: Big River Innovations, Inc., Nampa, ID (US)

( * ) Notice: Subject to any disclaimer, the term of this patent is extended or adjusted under 35 U.S.C. 154(b) by 0 days.

(21) Appl. No.: 10/852,930

(22) Filed: May 24, 2004

(65) Prior Publication Data

US 2005/0260902 A1     Nov. 24, 2005

(51) Int. Cl.
*B63B 35/79*     (2006.01)
(52) U.S. Cl. ............................................. 441/74; 87/13
(58) Field of Classification Search .................. 441/65, 441/74, 75; 114/215, 230.2, 242, 249, 253; 87/13; 244/16; 267/69; 623/13.11
See application file for complete search history.

(56) References Cited

U.S. PATENT DOCUMENTS

| | | | | |
|---|---|---|---|---|
| 1,615,568 A | | 1/1927 | Carroll | |
| 1,805,834 A | * | 5/1931 | Miller | 244/16 |
| 3,111,695 A | * | 11/1963 | Kelly, Jr. | 441/74 |
| 3,160,897 A | * | 12/1964 | Kelly, Jr. | 441/74 |
| 4,702,715 A | * | 10/1987 | Winick | 441/80 |
| 4,986,784 A | | 1/1991 | French | |
| 6,042,439 A | * | 3/2000 | Parten | 441/65 |
| 6,422,118 B1 | * | 7/2002 | Edwards | 87/13 |
| 6,431,932 B1 | | 8/2002 | Pederson | |
| 6,599,319 B1 | * | 7/2003 | Knudsen et al. | 623/13.11 |

* cited by examiner

*Primary Examiner*—Lars A. Olson
(74) *Attorney, Agent, or Firm*—Your Intellectual Property Matters, I; Robert A. Frohwerk (57) ABSTRACT

This water board sport system comprises a water skimming board device attached to one end of a resilient buoyant tether, the other end of which is secured to an anchor to provide a rider of the board with motive force from flowing water. The tether comprises a braid of mandrel-dipped latex tubing for extreme elongation. A rider may maneuver the board to stretch the tether, charging it as a cocked spring. Release of the force stored in the stretched tether propels the board and its rider upstream at speeds much greater than that of the water flow alone allowing the rider to fly at or above the water surface. Control features designed into the board enhance its maneuverability. Safety features are part of the system to ensure that the user may safely enjoy using it.

18 Claims, 6 Drawing Sheets

HIGH-PERFORMANCE RIVERBOARD SYSTEM

CROSS-REFERENCES TO RELATED APPLICATIONS

Not Applicable

STATEMENT REGARDING FEDERALLY SPONSORED RESEARCH OR DEVELOPMENT

Not Applicable

SEQUENCE LISTING OR PROGRAM

Not Applicable

FIELD OF THE INVENTION

The present invention relates generally to aquatic devices, especially water planing or skimming devices. More specifically, the described invention provides a system for water boarding which allows actions of a user to control movement upon a body of water with respect to an anchor while the motive force is supplied by the movement of water relative to the anchor. The preferred motive force is supplied by the movement of a body of flowing water such as in a river or other channel, whether natural or man-made, however the relative motion may be generated by a motorboat towing the user, whether or not the water is flowing with respect to its shoreline.

The distinguishing features of the described system over the prior art are related to the action of a propulsion subsystem that is based upon a special resilient cord subsystem that has been designed for extreme elongation. This stretch allows a user to harness the motive force of the water flow, storing considerable energy in an elastic spring. When the user releases the stored charge from the elastic spring, the force propels the board and its rider upstream. Speeds in excess of 20 mph have been achieved which suffice to cause the board to become airborne. Control and safety features are described to be consistent with the higher level of performance gained by the described means of propulsion.

BACKGROUND

A variety of board-like devices have been used in many different sports for centuries. Perhaps the oldest of these are sleds and skis that had been developed out of necessity for use in snow country and later adapted for sport. Water boards, though still quite old, are relatively more recent. Reports of surfboarding go back at least to 1779 when The Journal of Captain King described Captain Cook's recollection of surfboarders in Hawaii. Australian travelers returning from Hawaii eventually picked up the idea but not until the 1890's. Water skis were a fairly late arrival in the realm of water sports since their use required a water-borne power source to tow the skier. The first recorded water skiing was not until 1922 in Minnesota, but by 1939 the American Water Ski Association had organized the first National Water Ski Championship competition at Jones Beach on Long Island, N.Y. By the 1960's both water skiing and surfboarding had grown in popularity to the extent that it had become commercially attractive to apply technology to advance these sports.

In addition to surfboarding and water skiing, where the motive force is supplied respectively by waves in the surf or a motorboat, other forms of aquatic board sports have developed. Some of these are knee boarding and wake boarding which also require a motorboat. When paddle boarding the user self-generates the driving force through paddles. Another related sport is kite boarding which harnesses wind energy to allow a surfboarder to ride without waiting for waves. The prior art describes many devices related to these various forms of water sport. Some examples may be found in U.S. Pat. Nos. 1,615,568; 3,145,400; 3,237,222; 4,293,968; 4,986,784; 5,617,809; 5,970,900; and 6,042,439.

In 1927 Carroll disclosed in U.S. Pat. No. 1,615,568 an amusement device that could be used with a surfboard in the ocean. With Carroll's device an expansible member such as a spring was connected to a stationary object. The user would stretch the spring while wading or swimming into the surf away from the stationary object. At an appropriate time the user would initiate a release of the expansible member drawing the rider of a surfboard toward the stationary object on the shore. It is noted that the tension created in the expansible member was generated by the efforts of the rider in towing the device some distance away from the stationary object.

In the late 1970's as people were exploring board sports, including land-based skateboards, it became common to tie a rope to a board and attach it to just about anything that moved in order to catch a ride. It was about this time that the pioneers of riverboarding started with the basics, tying a rope to a board, and securing the other end of the rope to shore before jumping into a river with the board. With some experience, it was discovered that in addition to skimming on top of the water, the board could also be wedged into the current allowing board and rider to drift downstream and then shoot back upstream. Water flow in the river supplied the force to stretch the rope, and oftentimes bend the overhead tree branch that had been used as an anchor. The upstream propulsion was created by the rope and branch returning to their relaxed states. As riverboarders became more demanding, other items, such as garage door springs and garden hoses, replaced the rope or were tied to it to provide greater stretch. Eventually riders settled on bungee cords or inner tubes.

U.S. Pat. No. 4,986,784 issued to French in 1991 seems to be the first patent related to harnessing the motive force of flowing water as in a river, rather than requiring direct user effort through paddles or swimming against a spring as in Carroll's '568 patent, or the use of a motorboat. French's riverboard was secured to an anchor through a system that included a safety rod, and various tether members. One of the tether members was resilient which allowed the user to maneuver the board so as to stretch the resilient member away from an anchor and then draw the board and its rider upstream toward the anchor against the river current. French focused on some of the safety issues related to the sport of riverboarding that had developed in the wild.

Pederson's U.S. Pat. No. 6,431,932 of 2002 described a water board for use on a river and addressed some specifics of board design and means of user control. Pederson's board had a rounded tail to facilitate "carving" a turn, but his board was still flat. French's board was flat, but he allowed for optional components for "furnishing additional structural integrity" and for "urging the riverboard to skim the water surface." His stated desire, however, was that even after any additions "preferably the upper surface and the lower surface substantially mirror one another so that a user may ride on either side." The prior art of riverboarding has shown only minor deviations from flat boards. To find water boards where there has been any substantial deviation from flat, one must look to boards used for riding the surf.

Other sports, not related to aquatics, have taken the use of resilient cords to what some people consider extremes. In bungee jumping a user is tethered by a resilient cord to a high anchor, often a bridge or a crane, and jumps to experience the exhilaration of free-fall followed by a rapid reversal in G-forces as the cord is stretched near its limit. Shock cords used for bungee jumping In the United States typically have an elongation to 208% of their static length. These cords are often made of multiple parallel inner cords jacketed in a woven fabric that acts to keep the core elements of the cord from whipping and to safely limit elongation to within the bounds of the core elements. New Zealanders call the same sport bungy jumping (with a different spelling) and prefer all-rubber cords that stretch to 300–400% of their static length. An unrelated use of shock cords is for the launching of sailplanes. For this purpose surgical tubing is often used but the cord of preference is mandrel-dipped latex tubing capable of 850% elongation.

BRIEF SUMMARY OF THE INVENTION

The disclosed invention is a water sport system that attempts to enhance what has been an informal sport by bringing it to levels of performance previously unachievable. In its simplest form, an object of the present invention is to produce a water sport device that safely permits the user to maneuver about and skim on the surface of flowing water. Although it is anticipated that the most common use of such a device will be on rivers, it is also recognized that the device is useful on any flowing water, whether natural, or manmade such as a flume. Furthermore, towing the board behind a motorboat may create the requisite current.

The performance of the present invention centers on its special propulsion subsystem. To secure the riverboard to its anchor, a material is selected for its extreme elongation. One current material of choice is mandrel-dipped latex tubing, at least one manufacturer of which specifies that it is capable of a minimum of 850% elongation. Furthermore, the cord of the present invention is braided to extend the elongation of the propulsion subsystem beyond that of its individual component elements while at the same time enhancing its safety characteristics.

Building on that base, the described system includes features that have been specifically engineered for application to the sport of riverboarding. The shape of the board has been adjusted to optimize its use as a riverboard. Viewed from the top, the board presents significant surface area near its rear to be wedged into the current in order to charge the propulsion subsystem. The profile of the board deviates from the flat riverboards of the prior art by upturning both front (nose) and rear (tail), borrowing the surfboarding concept of rockers. Edges of the board in the described invention use special rail treatments to cut into the current to enable the rider to carve turns.

The attention to surfaces, shapes and edges not only boosts performance beyond the prior art but the increased level of control also makes for a safer ride. While a flat board has been acceptable when tethered to an anchor by a fixed length, non-stretching rope, the speeds attained when using the special propulsion subsystem of the present invention render a flat board to be dangerous. To overcome the risk of catching the nose of a flat board in the water and flipping it end over end at high speed requires the rockers incorporated into the present invention. Details designed into the propulsion subsystem protect the rider and bystanders against breakage and entanglement. In addition, the described invention offers a brake subsystem to restrict the motion of the board in case it is separated from its rider.

While some of the methods used within the described system are applied in order to accommodate performance that is higher than typically available from previous riverboards, those methods nonetheless serve to enhance the overall experience of the user even when the propulsion subsystem is not being fully utilized. In other words, the system provides control and safety means that alone serve to enhance the basic sport of riverboarding and then reach beyond that level to provide the participant a level of security consistent with the resultant higher performance of the described devices.

The present invention borrows techniques from many different fields. Although each technique is well understood within its own field, the combination has not been brought together previously. Furthermore, no suggestion has been discovered to apply these techniques in the described combination to this sport, or to any other. The contribution of the present invention is to use a variety of borrowed techniques to safely enhance the sport of riverboarding.

These and various other novel features and advantages of the present invention will be readily understood by those skilled in the related arts with reference to the following detailed description taken in conjunction with the accompanying drawings.

BRIEF DESCRIPTION OF THE DRAWINGS

FIG. 6A—Down Rail;
FIG. 6B—Rolled Rail;
FIG. 6C—Round Rail;
FIG. 6D—50/50 Rail; and
FIG. 6E—60/40 Rail.

DETAILED DESCRIPTION

The disclosed invention is a high performance riverboard system for use on flowing water. This riverboard will most often be used on a naturally flowing body of water such as a river, but may be used as effectively on a manmade channel, such as a flume, canal or aqueduct, or in a specially designed water park capable of providing a channeled flow of sufficient width to allow maneuverability, and sufficient depth to charge the spring force of the included propulsion subsystem. It may also be ridden on any body of water where it can be towed by a motorboat to simulate water flow.

System Overview

Figure 1:
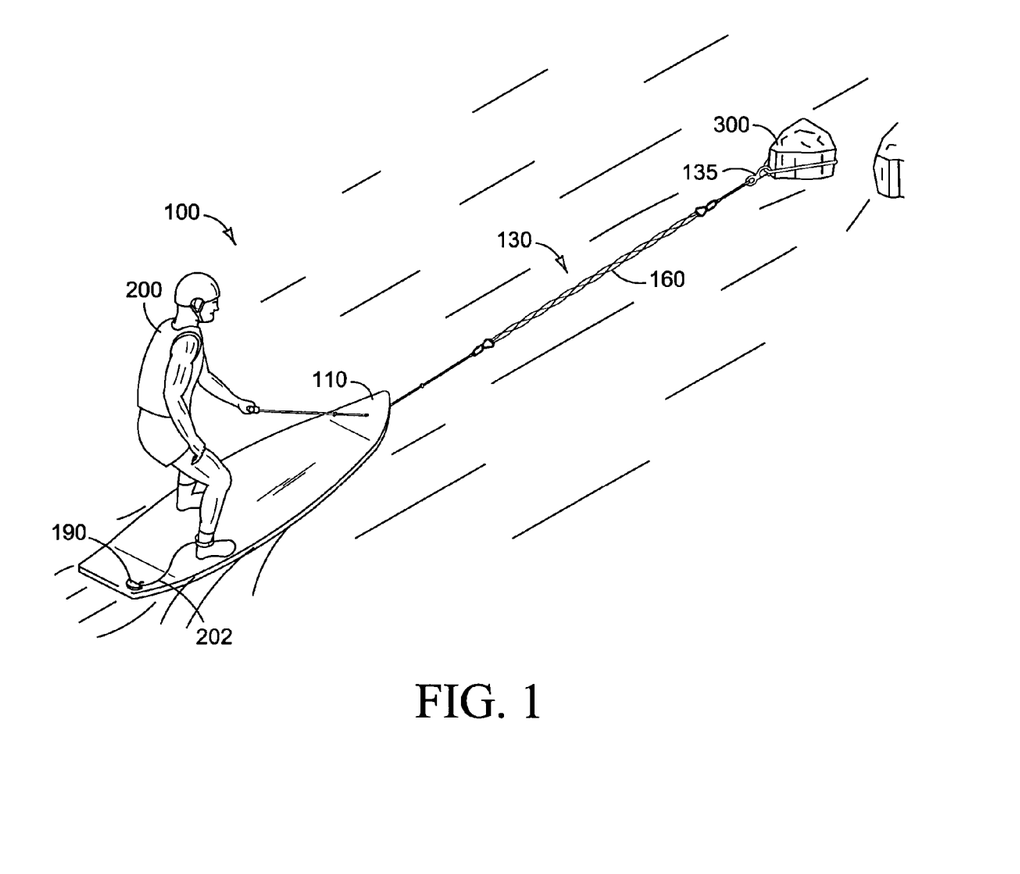
FIG. 1 is a perspective view of the present invention shown in use in a typical river setting where it is anchored to a large rock in the midst of the river and the rider is appropriately clad in a life vest and helmet.

To use the riverboard system, a rider or an assistant secures it to an object capable of acting as a suitable anchor. The anchor may be in, on or near the water, and either stationary or moving as a motorboat. A preferred embodiment of the riverboard system 100 showing its major elements is shown in FIG. 1, where anchor 300 is depicted as a large rock near the middle of a river. This particular choice of anchor is shown for purposes of illustration as it allows the rider maximum latitude for maneuvering on the surface of the flowing water. A user of the described invention must take into account various health, safety and legal issues in choosing an appropriate anchor. Having securely attached the riverboard system 100 to the anchor 300, the rider 200 jumps into the flowing water and floats or swims downstream until all slack is removed from the tethering subsystem 130. The rider then mounts the riverboard 110 and assumes a choice of position, whether standing, kneeling or lying prone. The weight of the rider 200 suffices to keep the riverboard 110 at or just beneath the surface of the water. The initial resistance of the combination of the riverboard 110 and rider 200 against the water flow keeps the tethering subsystem 130 taut but not significantly extended beyond its static length.

Once in position, the rider 200 may shift weight to maneuver the riverboard 110 in various directions, working the downstream force of the flowing water against the upstream force generated by the tethering subsystem 130. By leaning more weight to one side or the other, the riverboard 110 will be driven in the corresponding direction. Features of the preferred embodiment of the riverboard 110, which will be described later, amplify this effect allowing the rider 200 to carve a turn.

As the rider 200 shifts weight toward the rear of the riverboard 110, its front is uplifted and its rear drops deeper into the water. In this position, the board presents greater drag in the water, which places a greater load on the tethering subsystem 130. In the preferred embodiment the riverboard 110 is somewhat wider toward its rear so that the effective drag is intentionally amplified. The tethering subsystem 130 includes an elastic propulsion subsystem 160 that is stretched beyond its static length as the increased drag in this position draws the riverboard 110 carrying the rider 200 away from the anchor 300. When the rider 200 again shifts weight by leaning forward, the drag of the riverboard 110 against the water is reduced and the resilience of the propulsion subsystem 160 attempts to restore equilibrium by returning to its static unstretched condition. This propels the riverboard 110 toward the anchor 300. It is preferred that the rider 200 remains in contact with the riverboard 1 10, but this is not guaranteed. Alternate embodiments of the riverboard 110 may include various bindings to assist the rider 200 in maintaining contact with the riverboard 110 as it flies on or over the water toward the anchor 300. If the rider 200 should become disengaged from the riverboard 110, various safety features will come into play to prevent injury to either the rider 200 or bystanders. These safety features will be described later.

Tethering Subsystem Including Means of Propulsion

When in use, the riverboard 110 of the preferred embodiment shown in FIG. 1 is secured to an anchor 300 through tethering subsystem 130. The components of this subsystem are identified in FIG. 2. An anchor attachment means 135, which may be made from a combination of materials such as a hook, rope, chain, or cable that is appropriate for the particular choice of anchoring object, is fastened securely to the anchor 300. A first end of lead line 140 is coupled to the anchor attachment means 135. A wide variety of appropriate couplers for this purpose is known and may be borrowed from the fields of mountain climbing or boating. Some users may prefer a quick-release coupler such as some form of an attachment eye.

Figure 2:
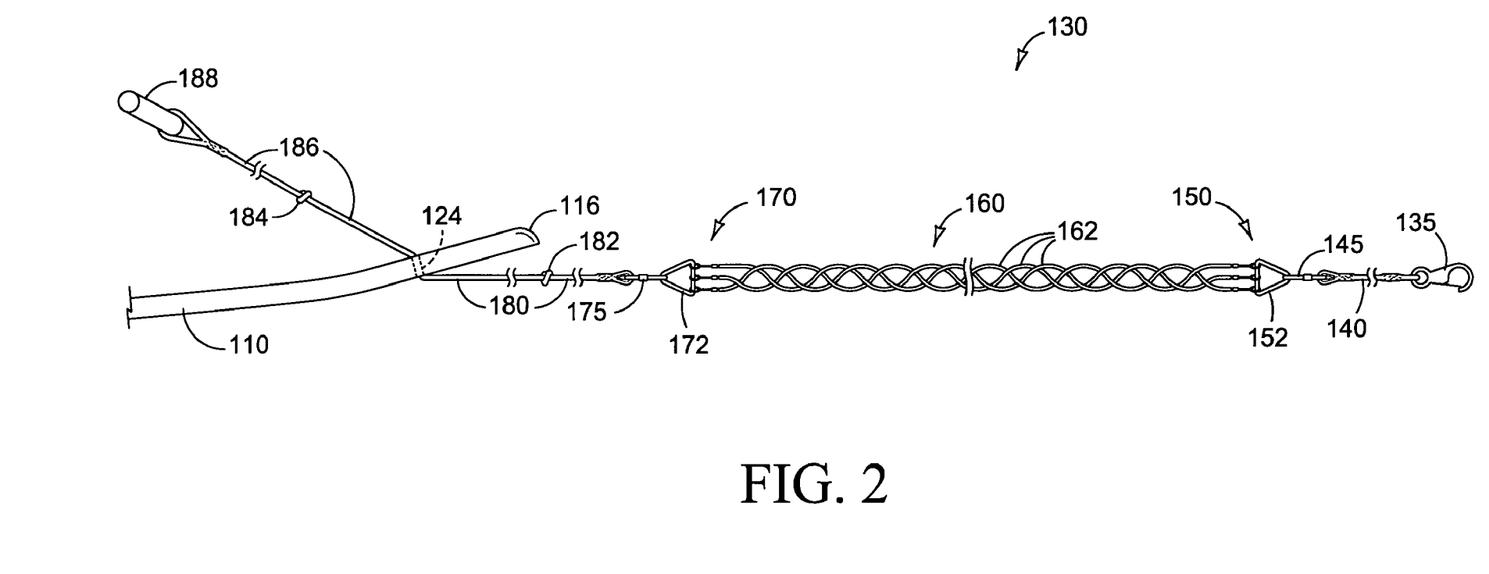
FIG. 2 identifies the components of a tethering subsystem with its included propulsion subsystem in the described invention.

The lead line 140 is made from a suitably strong rope that is generally nylon but may be another cord having similar suitable properties of high tensile strength with relatively little stretch. The length of the lead line 140 used in a particular high performance riverboard system will depend upon the location of the anchor 300 in relation to the flowing water. The use of the lead line 140 offers some safety features. For one, the end of the lead line 140 can be fitted with an appropriate connector and the length of the lead line 140 can be chosen to be sufficient that the rider 200 or a companion may avoid climbing trees or placing themselves in any other similarly dangerous situation. Another safety consideration is that the lead line 140 acts as a shock absorber.

The second end of lead line 140 is fastened to a first connective device 145. The carabiner used as the connective device 145 in the preferred embodiment is of the same type of equipment that is commonly used in mountain climbing and rappelling. Sometimes referred to as a snap ring, a carabiner is an oblong or triangular metal ring with a spring clip used to attach one rope to another rope or other item. Also, attached to the first connective device 145 is a first instance of multi-way connector 150.

Similar components are used at the opposite end of tethering subsystem 130, namely a second instance of a rope 180, having its first end fastened to a second connective device 175, which in turn connects to a second instance of special multi-way connector 170. The length of the rope 180 is not critical but will generally be approximately 6-feet. A first knot 182 is tied near the middle of rope 180 before the second end of rope 180 is fed through a hole 124 in the riverboard 110. This first knot 182 is large enough to prevent the rope 180 from being pulled through the hole 124 beyond the knot 182.

The rope 180 is pulled from the underside of the riverboard 110 through the hole 124 up to the first knot 182 and then a second knot 184 is tied close to the hole 124 to prevent the rope 180 from being pulled through the hole 124 past the knot 184. The portion of the rope 180 between the knot 184 and the second end of the rope 180 provides an extension 186 that is available to assist in carrying the riverboard 110 when out of the water or for securing it during transport. In an alternate embodiment the second end of the rope 180 may have an optional handle 188 fastened to it to provide a feeling of greater control to an inexperienced rider 200. The optional handle 188 will typically be like that used on water-ski ropes having a D-ring shape to distribute pressure across the hand or hands.

It is not necessary for the rope 180 to be fixed, or even snugly attached, to the riverboard 110, as long as the knots, or other stops, prevent the rope from slipping out of the hole 124. It is an important feature of the present invention that the rope 180 with an optional handle 188 be contiguous with the tethering subsystem 130. The placement of the hole 124 on the centerline of the riverboard 110 allows the rider 200 to exercise primary control by placement of feet and shifting of weight to achieve greater control and performance through the use of the rails and rockers than is possible when using the handle alone. When a handle is used, it must be attached to the riverboard 110 at the same single point as the tethering subsystem 130 to assist the rider 200 who has just mounted the riverboard 110 to achieve proper position and balance, after which time the optional handle 188 may safely be released. The other purpose of the optional handle 188 is to assist the rider 200 to remain in contact with the riverboard 110 when flying in response to the release of the charge in the propulsion subsystem 160.

The heart of the propulsion subsystem 160 in the preferred embodiment is a specially constructed resilient cord attached at a first end to the first multi-way connector 150 and at a second end to the second multi-way connector 170. It is this propulsion subsystem 160 that supplies the force to propel the rider 200 and riverboard 110 upstream at speeds of more than 20 mph.

The propulsion subsystem 160 is made from what might commonly fall into a class of bungee cord, albeit a very specialized one. The cord in the preferred embodiment begins as separate pieces of mandrel-dipped latex tubing. Because the individual elastic tubes 162 will be braided together, the minimum number of tubes is three. Although this quantity may be increased to provide a stiffer propulsion subsystem 160 or to accommodate a heavier rider 200, equivalent results can be obtained by using tubes of a different size and holding their number at three.

Mandrel-dipped latex tubing is not generally considered for sporting activities for at least two reasons: One, it is expensive; and two, it is presently manufactured only in a batch process, as opposed to a continuous process, and therefore can only be made in limited lengths. However, these objections are not of concern in the present invention where they are greatly outweighed by advantages.

The primary advantage of mandrel-dipped latex tubing, and the reason for its use in the present invention, is its extreme elongation. A typical specification rates mandrel-dipped latex tubing to be stretchable to a minimum of 850% of its static, unstretched length. This compares extremely well against standard bungee cords at 208%.

Various compositions of mandrel-dipped latex tubing may be used. The inclusion of carbon fibers in the tubing material makes it stiffer but lighter in weight. Since more skill is required to stretch a stiffer cord, the use of carbon fibers may be reserved for users desiring higher performance. Using a typical cord, the propulsion subsystem 160 in the preferred embodiment weighs about 12 pounds. The tubing may be colored for resistance to ultraviolet light or for appearance.

Typical elastic tubes 162 used in the propulsion subsystem 160 of the preferred embodiment have inner diameters of ⅛-inch to 3/16-inch and wall thicknesses ranging from 3/16-inch to ¼-inch. This results in individual elastic tubes 162 having overall thicknesses (outer diameters) of ½-inch to ¾-inch. The tubing composition as well as inner diameter and wall thickness may be selected from an array of products to be matched to various users according to their weight and skill levels.

Braiding the individual cords together has several advantages over the usual bundling mechanisms. Most bungee cords are wrapped in a woven fabric jacket that serves dual purposes by keeping the individual cords together as they whip in the air and by limiting elongation of the composite bungee to remain within specified bounds of its member elements. Braiding of the individual elastic tubes 162 offers a safety advantage by keeping them from separating without incurring any limitation to elongation that would be imposed by a fabric jacket. A related safety benefit of the resultant cord is that it is also somewhat less flexible than its component elastic tubes 162 so that the rider 200 is less likely to become entangled in it when it is slack. Another consideration is that since each of the cords in a braid must stretch at the same rate, a weaker one amongst them will effectively transfer part of its load to its closely coupled stronger neighbors. This leads to yet another significant safety consideration in that in case of a break in one of the member elastic tubes 162, the braided bundle will capture the broken member preventing it from unraveling suddenly, allowing it to fray slowly without the danger of snapping back and causing injury to the rider 200 or to a bystander. This gives the rider 200 an opportunity to safely discontinue use until the broken cord can be properly repaired.

Aside from safety issues, a braided propulsion subsystem 160 has other advantages with regard to elongation. As with any bundle of unjacketed cords, the elastic tubes 162 can be stretched closer to their limits of elasticity without encountering a catastrophic failure due to a single member. Additionally, the elongation of propulsion subsystem 160 is extended beyond that of its component elastic tubes 162 as the braid contracts in width. In the relaxed state of propulsion subsystem 160 a considerable portion of the length of each of the elastic tubes 162 is lost as each member winds around its partners. As propulsion subsystem 160 is stretched, the braid narrows and the angles of those windings are reduced. In the theoretical though unreachable limit, the elastic tubes 162 would become parallel and each would contribute its full length yielding an elongation independent of the braid. For the range of diameters of elastic tubes 162 used in the preferred embodiment, the braided propulsion subsystem 160 contributes an additional 15–20% elongation over what could be achieved with unbraided tubes.

Details of the construction of the propulsion subsystem 160 in the preferred embodiment are shown in FIG. 3. Only the attachment of the first ends of elastic tubes 162 to first multi-way connector 150 is shown in FIG. 3, since the second ends of elastic tubes 162 are attached to second multi-way connector 170 in the same manner. Furthermore, the connection between the second multi-way connector 170 and the second connective device 175 is symmetrical with the connection shown in FIG. 3 between the first multi-way connector 150 and the first connective device 145. It must be noted here that the use of carabiners in the preferred embodiment is not intended to restrict the present invention in any manner since a wide variety of hardware is available for accomplishing the equivalent function. One possible alternative among many is a double-eye swivel connector. It is also possible to make the necessary connections directly without the use of carabiners or other discrete connective devices though their use facilitates quick changes of components to accommodate various reconfigurations such as might be desirable in a rental market.

Figure 3A:
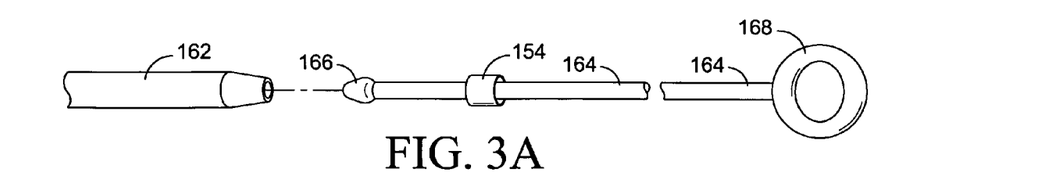
FIGS. 3A and 3B show the means of connecting to the end of an individual elastic tube, before and after assembly, respectively, to form the ends of the propulsion subsystem.
Figure 3B:
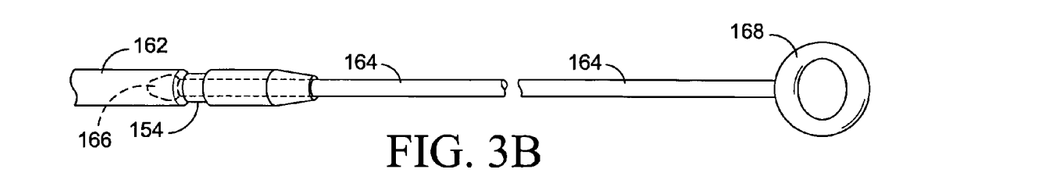
Figure 3C:
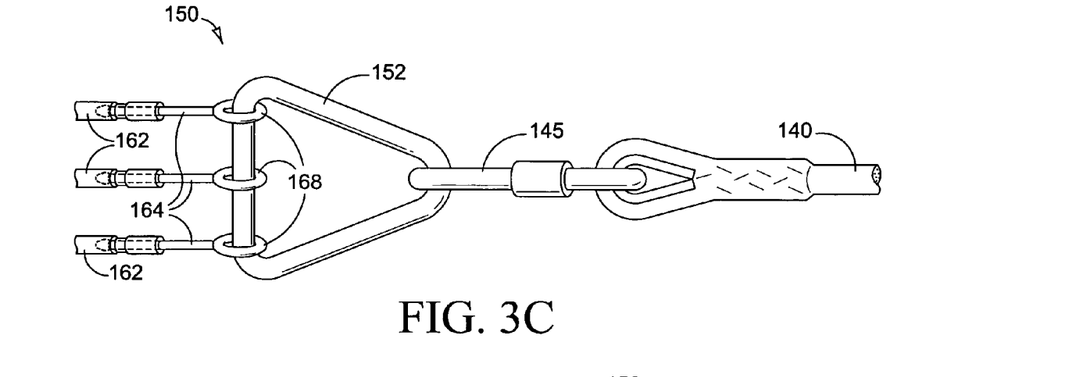
FIGS. 3C and 3D show the preferred embodiment and an alternative embodiment, respectively, for gathering a multiplicity of elastic tubes into a single composite connecting point at the ends of the propulsion subsystem.

Multi-way connectors 150 and 170 are constructed using a multiplicity of connecting rods 164 and are linked to a triangular D-ring 152 or 172, respectively. The connecting rods 164 are preferably made from a rod of steel, but other materials having equivalent strength characteristics may be substituted. The thickness of the connecting rods 164 should match the inner diameter of elastic tubes 162, for example, ⅛-inch in the preferred embodiment for a propulsion subsystem 160 to accommodate an average rider 200. Each connecting rod 164 has a keeper 166 on one end and a loop 168 on the other end. The keeper 166 is a bead-like protrusion having a generally oblong shape and is coaxial with connecting rod 164. The diameter of a cross-section of the keeper 166 is about three times that of the thickness of the connecting rod 164, and hence has the same three-fold relationship to the inner diameter of elastic tube 162.

Those familiar with the art of hardware fabrication will recognize many methods for construction of the connecting rods 164. One possible process would form the connecting rod 164 as a one-piece molded part with an integral keeper 166 on one end and a loop 168 formed at the other end. Another possibility is that the keeper 166 and the loop 168 begin as separate subcomponents that are welded to a rod or wire. Still another process may weld or form the keeper 166 onto one end of a rod the other end of which is formed into a loop 168 that is then closed by a weld or other process. Many other options exist as well.

To build the multi-way connector 150, a ring used as a collar 154 is slipped over the keeper 166 of connecting rod 164 and allowed to fall freely toward the loop 168. The collar 154 is of a material similar to that of the connecting rod 164 and has an inner diameter sufficient to clear the outer diameter of the keeper 166 by a small margin, say 1/32-inch. The keeper 166 of connecting rod 164 is then inserted into the inner diameter of a first end of elastic tube 162. The collar 154 which has thus been captured between the loop 168 and the first end of elastic tube 162 is then slid over the first end of elastic tube 162 until it comes to rest in close proximity to the keeper 166 which now resides inside the elastic tube 162. For a propulsion subsystem 160 for an average rider 200, the inner diameter of the elastic tube 162 will be 1/8-inch suggesting 3/8-inch as the diameter of keeper 166. That means that the inner diameter of collar 154 will be only slightly larger than 3/8-inch, which is less than the 5/8-inch outer diameter of the elastic tube 162, due to its 1/4-inch wall thickness.

To facilitate installation of the collar 154 over the elastic tube 162, the outer wall of elastic tube 162 is preferably tapered, and the elastic tube 162 is then stretched along the length of connecting rod 164 so as to temporarily reduce the outer diameter of the elastic tube 162 to receive the collar 154. This process serves to establish the required length of connecting rod 164 as well as the depth of insertion of the connecting rod 164 into the elastic tube 162. Also, it is desirable that the more blunt side of the keeper 166 be shaped so that it conforms well to the collar 154 when separated by the wall of the elastic tube 162. Depending upon the manufacturing process of the keeper 166 and the connecting rod 164, this shape may approximate a hemisphere or may even have a concave contour.

After the installation of a connecting rod 164 into each of the elastic tubes 162, the multiplicity of connecting rods 164 in a propulsion subsystem 160 are gathered together. The loop 168 of each of the connecting rods 164 is installed onto a common flat side of a triangular D-ring 152 and then the triangular D-ring 152 is closed to secure the end of the propulsion subsystem 160 and complete the construction of the multi-way connector 150. It is noted that use of a triangular D-ring 152 that can be opened as a carabiner may eliminate the need for connective device 145.

Figure 3D:
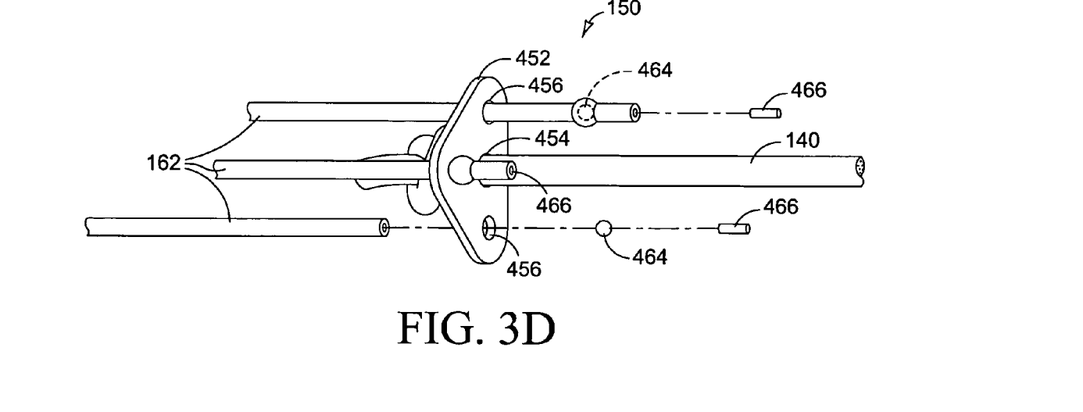

An alternate embodiment of the connections at the ends of propulsion subsystem 160 is shown in FIG. 3D, using a webbed multi-way connector. Again, only the attachment of the first ends of elastic tubes 162 to a first webbed multi-way connector 150 is shown, the corresponding multi-way connector 170 of FIG. 2 being similarly constructed. In this embodiment the multi-way connector 150 is built on a web 452 of durable waterproof material having a hole in its center and a multiplicity of holes equally spaced about the central hole to match the number of elastic tubes 162 to be connected. Many materials may be used without deviating from the present invention, including plates of various metals and sufficiently rugged plastics. Another possible material for the web 452 is a flexible, waterproof woven fabric, such as rip-stop nylon, into which grommets have been appropriately impressed to reinforce the holes. Although shown in FIG. 3D as a triangular web 452, the same approach can be applied using a bar of rigid material wherein the centers of the holes are collinear rather than located around one or more circles.

As shown in FIG. 3D for an alternate embodiment for the connection of three elastic tubes 162, the web 452 has four holes. A central hole 454 is located in the center of the web 452. It is this hole that will receive a connective device 145 or 175, or other connecting element. Three outer holes 456 are arranged in web 452 to form an equilateral triangle having at its center the central hole 454. These out holes 456 are sized with diameters no larger than the outer diameter of the elastic tubes 162.

An end of each of the elastic tubes 162 is fed through a corresponding outer hole 456, all three from the same side of web 452. A keeper 464 is inserted far enough into the hollow end of each elastic tube 162 to reduce the likelihood of being expelled when the elastic tube 162 is under force. The size of the keeper 464 is chosen with regard to the inner diameter of the hole or grommet used in outer hole 456 and the wall thickness of elastic tube 162. Keeper 464 must be large enough that the elastic tube 162 cannot pull both itself and keeper 464 through the outer hole 456. The keeper 464 may be a wooden ball or it may be made from other materials that will not deform in this application. Though only a minor consideration, wood is chosen here over hard plastic or metal for its relatively low weight.

To prevent keeper 464 from being dislodged after its insertion into the elastic tube 162, a plug 466 is used to close off the end of the elastic tube 162. The preferred embodiment uses a plug 466 of latex to seal the end of the elastic tube 162 and retain keeper 464. Latex was chosen for its similarity to the material of the elastic tube 162. In the limit a match in materials of the plug 466 to the elastic tube 162 would provide optimal adhesion forming a weld to seal the end of the tube. Of course, a band crimped around the elastic tube 162 would accomplish retention of the keeper 464, as would many other methods of termination, but other methods result in additional weight or bulk. Once sealed the elastic tubes 162 will not take on water when submerged and their inner diameters each form an air chamber that adds to their buoyancy.

Those familiar with manufacturing processes will recognize multiple methods and sequences for accomplishing a braid of the elastic tubes 162 and termination of their ends into first and second instances of multi-way connectors 150 and 170. The most straightforward method is to assemble multi-way connector 150, for instance, using only as much of the first ends of the elastic tubes 162 as necessary. This gives a means of supporting the components during the braiding process. An ideal braid would consume each of the three or more elastic tubes 162 at the same rate, leaving them all with the same remainder at the completion of the braid. In the real world of imperfect braids, the tubes will be consumed at different rates so that one of them will be nearly completely consumed by the braid while a portion of the others remains. This variation is accommodated by pulling the remaining lengths of the elastic tubes 162 to remove slack and prepare for the construction of multi-way connector 170. The longer elastic tubes 162 can be trimmed to match the shortest one, after which multi-way connector 170 is completed. This completed assembly is the heart of the propulsion subsystem 160.

In a typical application of the preferred embodiment, the manufacturing process begins with elastic tubes 162 that are about 25-feet in length. After assembly of the propulsion subsystem 160, the braided portion has a length of about 21-feet. When in use with the present invention as described here, that portion of the propulsion subsystem 160 may be stretched to 850% of 25-feet, or 212-feet. That would leave the rider downstream from where the propulsion subsystem 160 was in its relaxed state by about 191-feet, that being 212-feet less the initial braid length of 21-feet. When the rider 200 releases the built up tension in the propulsion subsystem 160, the elastic tubes 162 will attempt to return to their relaxed condition carrying the riverboard 110, preferably with the rider 200, back upstream by that same distance of 191-feet. Since travel of such magnitude raises the possibility of some overshoot, the importance of a suitably long lead line 140 will be recognized. The velocity achieved depends upon the weight of the rider 200 and how much contact the riverboard 110 maintains with the water, among other factors. It is possible for the riverboard 110 with its rider 200 to become airborne, intentionally or otherwise, and to reach speeds in excess of 20-mph.

It must be noted that reference here to elastic tubes, and in particular to the mandrel-dipped latex tubes of the preferred embodiment, is not intended to restrict the use of other formats or materials within the present invention. Solid sections of elastomeric material may be used in place of tubing, though this would require alternative means of connection at the ends of the braid that forms the heart of the propulsion subsystem 160. Also, many elastomeric materials other than mandrel-dipped latex are readily available, and may be substituted in the present invention. Though other materials lack the elongation properties of mandrel-dipped latex, other considerations, such as cost, may warrant their use in some applications or markets. Other desirable materials that can be braided together may appear in the future and may be used within the scope of the present invention as described here.

Before leaving the discussion of the tethering subsystem 130 and its unique component, the propulsion subsystem 160, it should be recognized that many of the features of a braided elastomeric cord would be useful in other fields of art. One application of special interest is a much scaled-down version to be used as a medical replacement for a ligament. Such an application takes advantage of many of the features of the much larger cord described above. Redundant elastomeric members, perhaps many more than the three shown in the embodiments described here, offer a hedge against failure of an individual member. In case an individual member does fail, the remaining members of the braid trap the broken member, allowing the user time to schedule repair, if the break is detected. Mandrel-dipped latex tubing is available with sufficiently low protein content that allergic reactions should not be triggered in many of those individuals who are allergic to the types of protein found in natural rubber latex. The increased elongation afforded by braiding opens the application to include many materials beyond the mandrel-dipped latex tube that is preferred in the present riverboard invention. Proper selection of material, diameters and lengths can be made so that the resulting artificial ligament may be properly pre-stressed to closely match natural ligaments in the same, or corresponding, area of the body.

Riverboard Subsystem

With the potential to travel such distances and to reach such speeds as are achievable when using the previously described propulsion subsystem 160 in the preferred embodiment, it is prudent to give special attention to design of an associated riverboard 110. Details of the riverboard 110 of the present invention in its preferred embodiment are shown in FIGS. 4–6.

Figure 4:
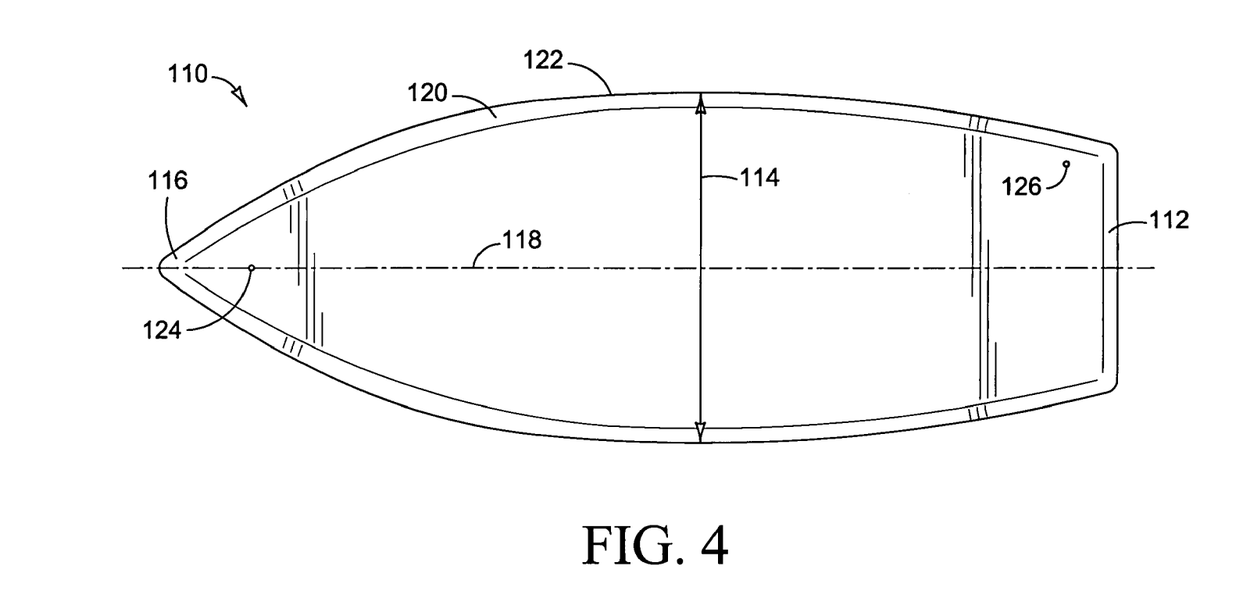
FIG. 4 shows a top view of a riverboard subsystem of the present invention.
Figure 5:
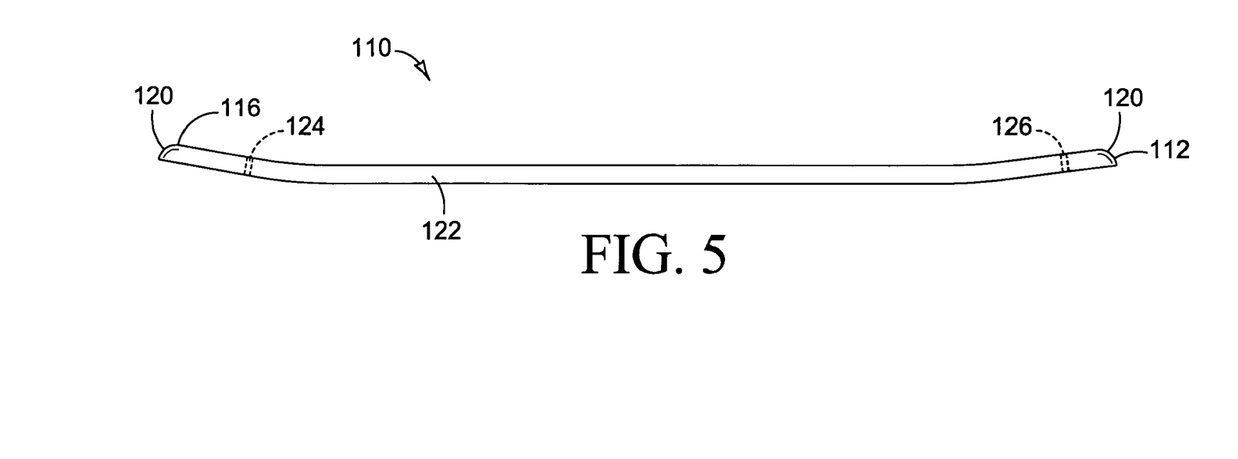
FIG. 5 is a side view of the riverboard subsystem of the present invention.

The top view of a riverboard 110 is shown in FIG. 4. For reference purposes the riverboard 110 as shown is about 5-feet long, whereas an optimal length for a particular situation depends upon such factors as the size and skill of the rider 200, and the rate of water flow. The greatest width 114 of the riverboard 110 as shown is about 23-inches and occurs rearward of the center of the riverboard 110 at about 40% of the distance from the rear 112 toward the front 116. The width near the rear 112 of the riverboard 110 is intentionally significantly greater than that near the front 116. Prior to any later addition of tail features, the rear is generally about 60% of the width at the widest 114. This exposes more surface area to the flowing water when the rider 200 maneuvers the riverboard 110 to tilt the front 116 upward and drop the rear 112 below the surface of the water. The greater surface area toward the rear presents more resistance to the water flow, which provides more force to stretch the propulsion subsystem 160.

A hole 124 is used to secure the riverboard 110 to the tethering subsystem 130. The hole 124 is located on the longitudinal centerline 118 of the riverboard 110 in the front one-third of the length of the board, shown in FIG. 4 as about 6-inches back from the front 116. The tethering subsystem 130 is connected to the riverboard 110 from the underside in the manner previously described in relation to FIG. 2. Approaching the riverboard 110 from below causes tethering subsystem 130 to give a slight uplift to the front of the riverboard 110, which tends to drop the rear lower into the water, which in turn enhances maneuverability and facilitates charging of the elastic spring in the propulsion subsystem. A first knot 182 is tied near the middle of the rope 180, then the second end of the rope 180 is fed through the hole 124 from the underside of the riverboard 110 up to the first knot 182 and a second knot 184 is tied close to the hole 124 to prevent the rope 180 from being pulled through the hole 124 past the knot 184. Also, as previously described with regard to FIG. 2, the portion of the rope 180 between the knot 184 and the second end of the rope 180 provides an extension 186 that may connect to an optional handle 188 for greater control, especially by an inexperienced rider 200.

Another feature of the riverboard 110 that is apparent in FIG. 4 is the curved sides 120. These aid in maneuverability, especially when "carving" a turn. The homemade boards from the early days of riverboarding often had straight square sides, which would allow for turning the board but with limited control. In general, more curve of the sides results in faster turns but with an associated loss of control. The limit of too much curve extending from the sides into the rear is a round board as shown in prior art (see Pederson's '932). This allows a rider to "carve" a rapid turn but leaves no recognizable breakpoint between the sides and the tail of the board to control that turn.

Although the preferred embodiment uses curved sides with a square tail, the present invention allows for alternate embodiments having variations in the shape of the tail for special effects or control considerations. The square tail as shown in FIG. 4 tends to draw the rear deeper into the water, giving more "bite" for greater control; it then throws water up behind the riverboard 110 in a pattern known as a "rooster tail." The swallowtail rear (as seen in French's '784) is not drawn as deeply into the water, which results in looser control. A single, pointed "pin tail" provides still looser control.

Turning attention now to FIG. 5, it will be seen that the present invention is unlike the flat boards described in the prior art related to riverboarding. Here both the front and rear sections curve upward slightly in what are known among surfboard designers as rockers. In the preferred embodiment the front 116 is about 1-¾ inches above the flat center section with the curve extending rearward about 10-inches from the front 116. About 8-inches from the rear the riverboard 110 begins to flare upward so that the rear 112 is about 1-inch above the flat center section. This shape gives the rider some advantage over the flat boards that have been described in the prior art.

Though the rockers do present somewhat more drag than a flat board would, this is not of concern where the motive force is supplied by flowing water, whereas it would warrant consideration where there is a dependence on the efforts of the rider as on a paddleboard, for instance. Both front and rear rockers improve control in turns. Having rockers also helps to avoid catching either the front or the rear in the flowing water. Furthermore, if the front 116 does drop below the surface of the water, the curve of the rocker serves to bring the riverboard 110 back above the surface.

Similarly, when the rider 200 is positioned mid-board, the rear rocker tends to correct the rear 112 against unintentional submersion. However, when the rider 200 is positioned toward the rear of the riverboard 110, the drag of the rear rocker assists to drop the rearward portion of the riverboard 110 into a position suitable for wedging against the water flow. Overall, the profile of the riverboard 110 in the present invention greatly improves over the hydrodynamics of the prior art allowing it to glide more easily over the surface, while offering greater control during maneuvers.

In addition to the shape of the board seen in the top view of FIG. 4 and the side view of FIG. 5, the edges, or rails, may have a variety of contours.

Representative rails are shown in the cross-sections of FIG. 6 with different shapes to serve different purposes and user preferences.

Figure 6A:
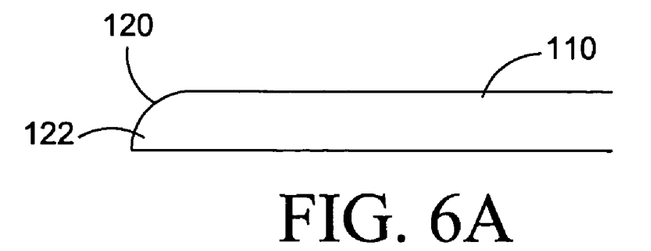
FIGS. 6A–6E depict various options of edge details that may be used on a riverboard subsystem of the present invention. The edges shown are named as follows.
Figure 6B:
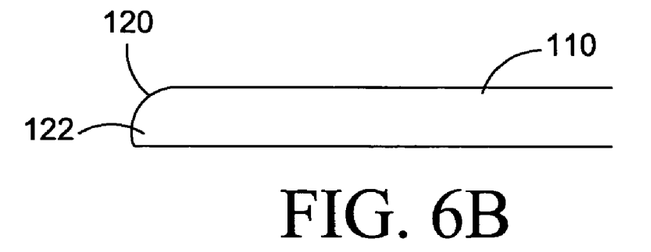

In a Down rail, as shown in FIG. 6A, the edge meets the bottom surface of the riverboard 110 at a right angle in a relatively sharp transition, while the transition from the edge to the top surface of the riverboard 110 is rounded. Down rails conform well to the water flow, that is they have a good bite and hold well. They offer good control and fast turns. In the preferred embodiment, the entire perimeter of the riverboard 110 uses a Down rail, however there are situations where the shape of the rail, may vary for different sections of the riverboard 110 within the scope of the present invention.

Other edge treatments shown in FIG. 6 are known in the art related to surfboards and are offered here for reference. All are useful in differing situations and some will be preferred over others by some riders.

A Rolled rail (FIG. 6B) is like a Down rail but the edge is undercut to meet the lower surface of the riverboard 110 in an obtuse, rather than right, angle. This type of edge is said to be rolled under. Rolled rails offer fair control which is reduced when the rider 200 shifts weight forward.

Figure 6C:
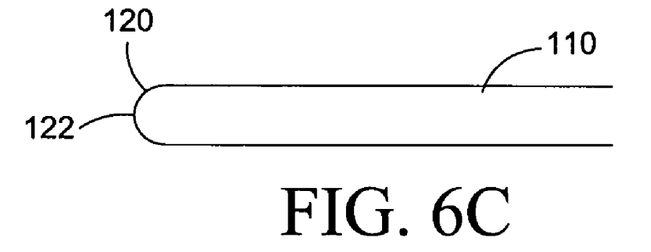
Figure 6D:
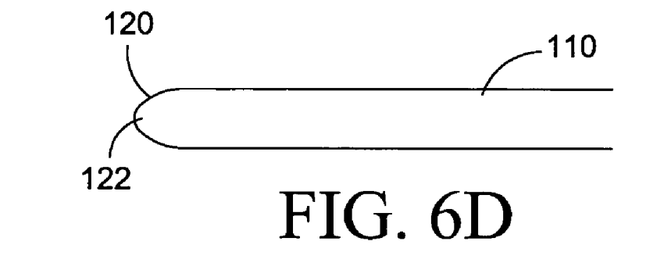
Figure 6E:
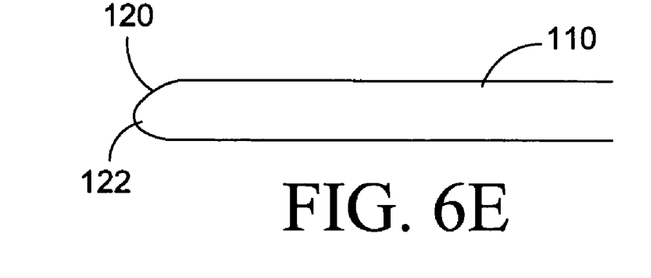

The Round rail depicted in FIG. 6C is simply a half round, meeting both upper and lower surfaces of the riverboard 110 at tangents. Round rails sacrifice some control for a smoother ride. The 50/50 rail in FIG. 6D is an elliptical version of the Round rail, drawing the centerline of the edge to a sharper radius, halfway between the upper and lower surfaces of the riverboard 110. The 60/40 rail of FIG. 6E is a variation of the 50/50 that simply drops the point of rollover between upper and lower surfaces of the riverboard 110 to be 10% below the centerline of the edge.

Down rails (FIG. 6A) may be either hard or soft, depending upon the radius of the curve into the top surface of the riverboard 110. A hard rail is one having a radius of ⅛-inch or less, while a soft rail has a radius of at least ½-inch. A hard rail with its sharp transition will turn faster than a rail with a soft, gradual transition. The limit of a hard rail is square, which is to be avoided. Generally, boards with hard rails are susceptible to unintentional catching of an edge in the water, however the rockers of the preferred embodiment of the present invention tend to relieve that concern. A hard rail also encourages water release and consequently will plane faster presenting less drag in the water than a soft rail. A drawback of hard rails is that they tend to turn in the arc described by the combination of the rocker and tail. Soft rails allow the rider 200 to make gradual turns with some controlled slippage. Some riders may prefer boards with hard down rails toward the rear of their boards for control and a round or rolled rail in the front section of their board. The present invention allows for all possible variations of edge treatments to match the skill and preferences of their riders.

In some applications, primarily at high speed, the rails alone may not provide adequate control. Such speeds occur in two sets of circumstances: on water having a high flow rate; and when the rider 200 is propelled upstream against the current flow by discharge of the propulsion subsystem 160. In such situations one or more fins may be added to the underside of the riverboard 110. Because fins, under normal circumstances, are always in the water, they allow the rider 200 to make sharper, quicker turns. Fins may be offered as detachable accessories to be installed or removed depending upon water conditions and user preference. No particular fin design is offered here since there are many variables that must be taken into account to optimize their use. Fins in the prior art are perhaps best understood by those familiar with the field of surfboard design.

In its preferred embodiment the riverboard 110 is constructed from composite materials. This is not to be taken as a limitation where other materials having suitable properties are available. Composites allow considerable variety in sizes and shapes to accommodate a wide range of potential users, while reducing the weight of the finished riverboard 110. In light of the exemplary sizes described above, boards will be scaled proportionately to provide different lengths to accommodate a range of riders, including special smaller boards for children.

Beginning with a 1-inch thick extruded polystyrene core to provide a buoyant, rugged base, the board blank is shaped and then sanded or otherwise roughened to provide adhesion for the laminates that follow. A quadraxial polystyrene fabric is applied to the roughened blank.

At this point in the construction process, all anticipated holes will be introduced into the board blank so that they may be reinforced. The hole 124 for attachment of the rope 180 from the tethering subsystem 130 will be subject to considerable pullout force which could not be withstood by the board's core material alone. The area of the board blank to be reinforced at this location must be large enough to support the knot 184, or its equivalent. Other holes will be discussed later, but all will be treated similarly at this point in the construction. Each hole location is drilled to 1-inch diameter and then filled with a mix of epoxy, fibers and microballoons. Once this has cured, the appropriate hole is drilled to its final required dimension. Other treatments to accommodate the necessary reinforcement of a foam core are known in the art and may include insertion of such items as durable sleeves but consideration should be given to weight and balance of the resulting riverboard 110.

The next layer provides a base for graphics, including logos or other decorative or identifying marks. Preferably this layer is a PBT-plastic sheet that has had the graphic images applied through a dye-sublimation process. This provides a durable layer for the graphics. Where PBT is not available in sufficient widths, rice paper may be used as is common for surfboards.

A fiberglass fabric is applied next and all surfaces are then sealed with an epoxy resin. The upper surface of the nearly completed riverboard 110 receives a ⅛-inch thick sheet of EVA foam. Alternately, a neoprene pad may be used but the EVA is preferred for its durability. This pad may cover the entire upper surface, but is most important in the rear half or so of the riverboard 110. The primary purpose served by the pad is to provide traction to help the rider 200 maintain footing on a wet board. The greater friction provided by this compliant surface is especially important to a rider 200 who is attempting to dip the back of the board into the water from a kneeling position. Secondarily, the pad acts as a cushion that is appreciated when the rider 200 assumes a kneeling position. These considerations will be particularly appreciated in a rental market and for novice riders.

To provide maximum control for the more experienced rider, an allowance is made for fastening bindings to the riverboard 110. The preferred form of foot binding is the step-in sandal-like form similar to what is used on kite boards. These bindings are particularly useful when the rider 200 moves into position to uplift the front 116 of the riverboard 110 in order to drop the rear 112 into the water to increase drag to charge the propulsion subsystem 160. The bindings also help the rider 200 to remain in contact with the board without using an optional handle 188 when flying over the water as the charge in the propulsion subsystem 160 is released.

Safety Features

Many safety features have been described above as being incorporated into the high performance riverboard system 100 either as part of the riverboard 110 itself, or within the tethering subsystem 130, especially as it includes the propulsion subsystem 160. These will be summarized below. In addition, the preferred embodiment of the present invention includes an underwater brake.

Figures 7, 8:
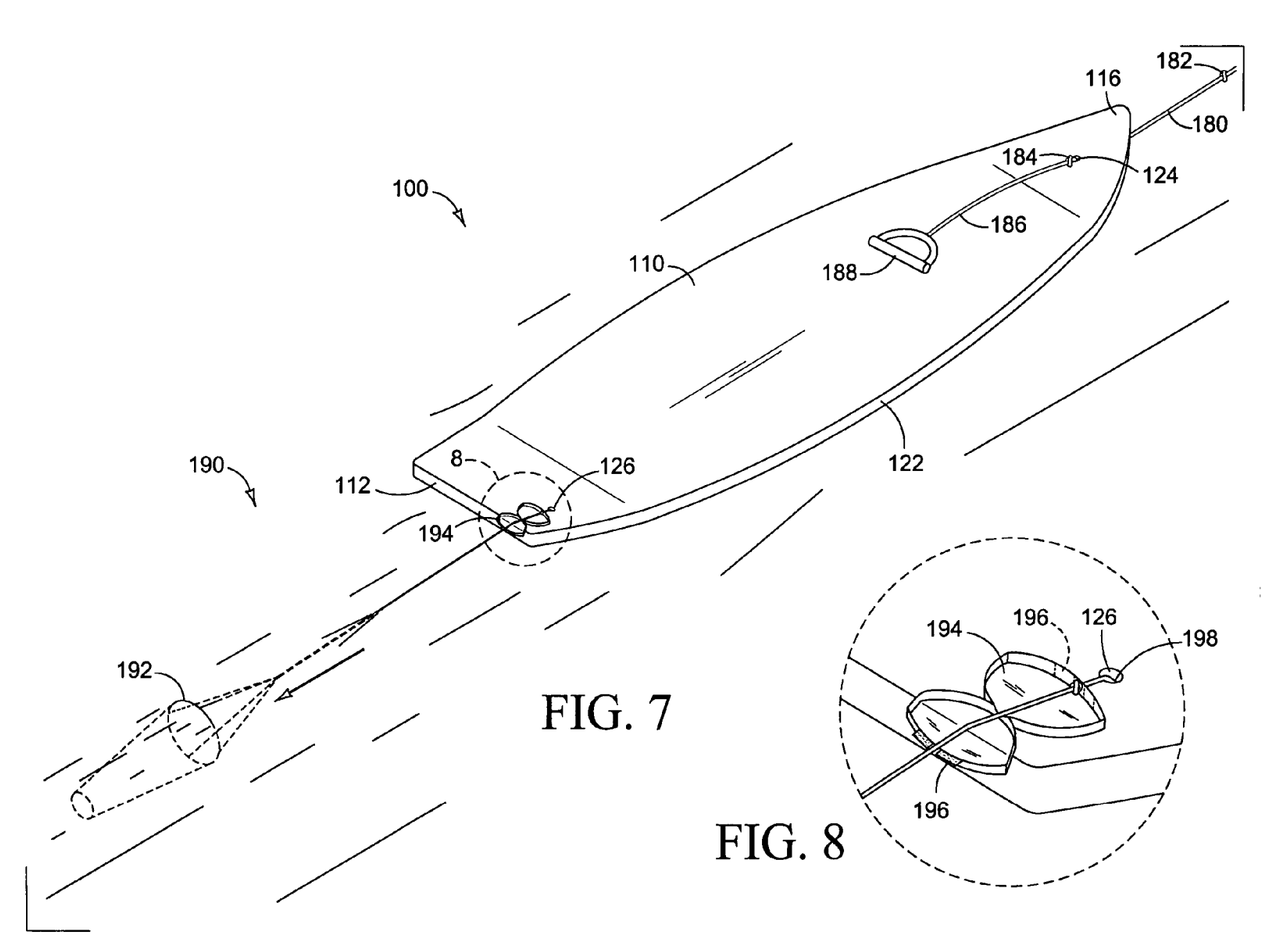
FIG. 7 shows the connection of a brake subsystem to the riverboard subsystem of the present invention with the brake in a deployed condition.
FIG. 8 is a close-up view of the storage means of the brake subsystem after the brake has been deployed.

The brake subsystem 190, shown in FIG. 7, serves to limit the speed and damp any wayward motion of the riverboard 110 in case it is separated from its rider 200. The brake subsystem 190 behaves like a drag parachute. The parachute 192 is about 4-inches in diameter at its open mouth. A hole 126 near the rear of the riverboard 110 (also shown in FIG. 4) provides for attachment of the brake subsystem 190. Under normal riding conditions, the parachute 192 is packed into a small pouch 194 which is held closed by a hook and loop fastener 196, though a snap or other means of closure could be used as well. In turn the hook and loop fastener 196 is connected to a ripcord 202, which is strapped around the ankle of the rider 200. If the rider 200 is dislodged from the riverboard 110, the rip cord 202 pulls the hook and loop fastener 196 causing it to separate thereby releasing the parachute 192 from the small pouch 194. Still connected to the riverboard 110, the parachute 192 will drag in the water, or air if that is the case, slowing the motion of the riverboard 110 until it can be safely retrieved. It will be apparent that there are alternate means of accomplishing the deployment of a drag parachute that lie within the intended scope of this description of the preferred embodiment.

As has been pointed out above, safety features are described to be consistent with the higher level of performance gained by the described means of propulsion. Some of the safety features are inherent in the material and construction of the tethering subsystem 130 and its included propulsion subsystem 160. The lead line 140 acts as a shock absorber in addition to extending the range of options available to the user for safely securing the tethering subsystem 130 to an anchor 300 without the need to climb trees or bridges, for instance. The fact that the individual elastic tubes 162 are braided together into the propulsion subsystem 160 keeps them from separating and tangling. The braid will capture an individual elastic tube 162 that breaks so that any fray will occur slowly without the entire assembly snapping.

The contoured surface of the riverboard 110, with some contribution from edging treatments, creates what amounts to an airfoil. Such considerations in the basic design of this riverboard 110 bring a dimension of performance unheard-of and unachievable with conventional devices in the prior art. Along with that performance comes some safety features that are inherent in the design. The upward curve toward the front 116 of the riverboard 110 serves to keep the nose of the riverboard 110 from catching in the water when gliding. If the riverboard 110 should become submerged, it is self-correcting by design; the curve of the rocker acts to return the riverboard 110 to the surface. When flying, the airfoil also tends to bring the riverboard 110 back down to the water surface. The optional handle 188 is unlike that commonly used in designs within the prior art in that it is not needed for control when riding, but is available for keeping the riverboard 110 from getting away when flying. When it is present, the handle 188 is tied down through a single point so as to be contiguous with the tethering subsystem 130 to provide stability to the riverboard 110.

The description here of alternate embodiments of a riverboard sport system is in no way intended to suggest that these are the only embodiments available. Now that the invention has been described, it will be apparent to those of ordinary skill in the many related arts that various combinations of the methods and configurations described here can be implemented in keeping with the intent of the disclosed invention and may have particular utility in some applications without departing from the spirit and scope of the invention as represented in the attached claims. Furthermore, the individual subsystems described for use in this particular form of water sport are not meant to limit in any manner the application of those subsystems to other fields of art.

What is claimed is:

1. A riverboard system for use on water flowing with respect to an anchor, said riverboard system comprising:
   (a) a board member which is buoyant in water, said board member having a concave upper surface, a convex lower surface,
   a convex front and two non-parallel sides extending from the front to a rear, said two non-parallel sides having symmetry each to the other through an orthogonal plane that intersects a centerline of said board member longitudinally, and a single point of attachment within the front third of said board member, said point of attachment lying on the centerline; and (b) an elongated resilient tether member having an inherent property of flotation, said tether member comprising a braid of at least three elastomeric tubular elements having first and second ends, wherein said first ends are connected to said single point of attachment and said second ends are adapted for a connection to the anchor.

2. The riverboard system of claim 1, wherein each of said at least three elastomeric elements comprises mandrel-dipped latex tubing.

3. A resilient cord comprising at least three elastomeric elements, each of said at least three elastomeric elements being formed as a tube, each of said at least three elastomeric elements having first and second ends, and each of said at least three elastomeric elements being conjoined to each of the other of at least three elastomeric elements over substantially their entire lengths by means of braiding, said first ends being collectively joined in a first connector to form a single common first end, and said second ends being collectively joined in a second connector to form a single common second end.

4. The resilient cord of claim 3 wherein each of said at least three elastomeric elements is a tube comprising mandrel-dipped latex.

5. The resilient cord of claim 3 for use in a propulsion subsystem for a sporting device.

6. The resilient cord of claim 5 wherein the sporting device is a waterboard.

7. The resilient cord of claim 5 wherein the sporting device is a riverboard.

8. The resilient cord of claim 5 wherein the sporting device is a wakeboard.

9. The resilient cord of claim 5 wherein the sporting device is a wakeboard and an anchor is a buoy.

10. The resilient cord of claim 5 wherein the sporting device is a catapult.

11. The resilient cord of claim 5 wherein the sporting device is a catapult for launching a sailplane.

12. The resilient cord of claim 3 for use as a replacement for living tissue.

13. The resilient cord of claim 3 for use as a replacement for a ligament to accommodate extension and flexion of a joint.

14. A safety brake for use with an aquatic board device, for damping motions of said aquatic board device when said aquatic board device is in water or near the surface of a body of water, wherein said aquatic board device is a riverboard, a surfboard, or a wakeboard, the safety brake comprising:

a drogue;

rigging lines having first ends and second ends;

a storage means; and a deployment means,

Wherein said first ends of said rigging lines are attached to that end of said drogue which is more open when said drogue is in a deployed condition, wherein said second ends of said rigging lines are attached to said aquatic board device, wherein said storage means comprises a closable container capable of containing said drogue, wherein said closable container is held in a closed condition by a releasable fastener, and wherein said deployment means is activated by a separation of a rider of said aquatic board device from said aquatic board device to release said drogue from said storage means.

15. The safety brake of claim 14 wherein said releasable fastener comprises a hook and loop fastener.

16. The safety brake of claim 14 wherein said releasable fastener comprises a snap fastener.

17. The safety brake of claim 14 wherein said deployment means further comprises a rip cord having a first end and a second end, said first end of said rip cord is attached to said rider of said aquatic board device and said second end of said rip cord is attached to said storage means.

18. The safety brake of claim 14 wherein said deployment means further comprises a rip cord having a first end and a second end, said first end of said rip cord is attached to said rider of said aquatic board device and said second end of said rip cord is attached to said releasable fastener causing said releasable fastener to be released by a separation of a rider of said aquatic board device from said aquatic board device.

* * * * *